(12) United States Patent
Yamaguchi et al.

(10) Patent No.: US 6,843,670 B2
(45) Date of Patent: Jan. 18, 2005

(54) IC CARD CONNECTOR (75) Inventors: Tomisaburo Yamaguchi, Kanagawa (JP); Mitsuhiro Tomita, Yamato (JP)

(73) Assignee: Molex Incorporated, Lisle, IL (US)

( * ) Notice: Subject to any disclaimer, the term of this patent is extended or adjusted under 35 U.S.C. 154(b) by 0 days.

(21) Appl. No.: 10/312,826

(22) PCT Filed: Jun. 29, 2001

(86) PCT No.: PCT/US01/21057
§ 371 (c)(1),
(2), (4) Date: Apr. 16, 2003

(87) PCT Pub. No.: WO02/07269
PCT Pub. Date: Jan. 24, 2002

(65) Prior Publication Data
US 2003/0157839 A1 Aug. 21, 2003

(51) Int. Cl.[7] .............................................. H01R 13/62
(52) U.S. Cl. ...................................... 439/159; 439/157
(58) Field of Search ................................. 439/159, 158, 439/157, 607, 188

(56) References Cited
U.S. PATENT DOCUMENTS

| | | | | |
|---|---|---|---|---|
| 4,887,188 A | * | 12/1989 | Yoshida et al. | 361/684 |
| 5,051,101 A | * | 9/1991 | Komatsu | 439/159 |
| 6,033,243 A | * | 3/2000 | Kajiura | 439/159 |
| 6,068,516 A | * | 5/2000 | Chang | 439/633 |
| 6,071,135 A | * | 6/2000 | Obara | 439/159 |
| 6,142,801 A | * | 11/2000 | Koseki et al. | 439/159 |
| 6,203,378 B1 | * | 3/2001 | Shobara et al. | 439/638 |
| 6,398,567 B1 | * | 6/2002 | Nishimura | 439/159 |
| 6,572,392 B2 | * | 6/2003 | Motojima | 439/159 |
| 6,585,542 B2 | * | 7/2003 | Nishio et al. | 439/630 |

* cited by examiner

*Primary Examiner*—Hien Vu
*Assistant Examiner*—X. Chung-Trans
(74) *Attorney, Agent, or Firm*—Stacey E. Caldwell (57) ABSTRACT

A card connector for connecting different types of IC cards includes a housing for receiving an IC card for movement between a preload position and a latched position. A slider is movably mounted on the housing and engageable with the IC card for movement therewith between the preload and latched positions. A latch mechanism is operatively associated between the slider and the housing for latching slider in the latch positions. A lock member on the slider is engageable in a locking position with a lock portion of one type of IC card for locking the IC card to the slider, the lock member being movable to an inoperative position to allow an IC card of a second type which does not have a lock portion to be inserted into the connector.

6 Claims, 6 Drawing Sheets

FIG.26

IC CARD CONNECTOR

FIELD OF THE INVENTION

This invention generally relates to the art of electrical connectors and, particularly, to an IC card connector assembly for connecting an IC card, such as a memory card, in some form of IC card reader system.

BACKGROUND OF THE INVENTION

IC (integrated circuit) cards are known in the art and contain intelligence in the form of a memory circuit or other electronic program. A card reader is used to read the information or access the memory stored on the card. IC cards are used in countless applications today, including video cameras, smartphones, music players, ATMs, cable television decoders, toys, games, pc adapters and other electronic applications.

Typically, an IC card includes a terminal array for connection through an electrical connector to a card reader system and then to external equipment. The connector readily accommodates insertion and removal of the card to provide quick access to the information and program on the card. The card connector includes contacts for yieldably engaging the terminal array of the card.

Various IC card connectors include some form of card ejector mechanism whereby an IC card is simply inserted into the connector, and the ejector mechanism is used to facilitate removal of the card from the connector. Some connectors include slider members which engage the IC card for movement into and out of the connector. Latches, ejector mechanisms and other operative functions then are operatively associated with the slider member rather than the IC card itself. One problem with some ejector mechanisms, such as those which use slider members, is that the connector is limited for use with a specific type of IC card or a card which is customized for the specific connector. For instance, the card may have a latch or lock portion, such as a cut-out or notch, which is engaged by a latch or lock member on the slider or other component of the ejector mechanism. It would be desirable for such connectors to accept both the customized card as well as a standardized IC card as needed.

Another problem with IC card connectors is that if the IC card is inserted into the connector in an improper orientation, the contacts of the connector could be damaged. The present invention is directed to solving these various problems in a simple, efficient and cost effective IC card connector.

SUMMARY OF THE INVENTION

A general object of the invention is to provide a new and improved IC card connector for connecting different types of IC cards.

Another object of the invention is to provide a card connector which allows an IC card to be inserted thereinto in only one orientation.

In the exemplary embodiment of the invention, the card connector includes a housing for receiving an IC card for movement between a preload position and a latched position. A slider is movably mounted on the housing and is engageable with the IC card for movement therewith between the preload and latched positions. Latch means are operatively associated between the slider and the housing for latching the slider in the latched position. A lock member on the slider is engageable in a locking position with a lock portion of one type of IC card for locking the IC card to the slider. The lock member is movable to an inoperative position to allow an IC card of a second type which does not have a lock portion to be inserted into the connector. Preferably, biasing means are provided for biasing the lock member toward its operative position.

According to one aspect of the invention, the lock member is integral with the slider, and the entire slider is movable on the housing to move the lock member to its inoperative position. In the preferred embodiment, the slider is pivotally mounted on the housing to pivotally move the lock member to its inoperative position. The biasing means is effective to bias the slider toward the operative position of the lock member. The connector herein includes a metal shell about at least a portion of the housing, and the biasing means is provided by a flexible wall portion of the shell.

The latch means herein includes a cam mechanism defining the movement of the slider on the housing. The cam mechanism has a first cam groove on the slider defining movement of the slider to the latched position. A second cam groove on the slider defines movement of the slider back to the preload position. A cam follower pin on the housing rides in the cam grooves.

According to another aspect of the invention, the metal shell about the connector housing has a stop portion aligned with a cutout area of the IC card when the card is properly oriented for insertion into the housing, to prevent insertion of an improperly oriented card. The metal shell is stamped and formed of sheet metal material, and the stop portion is formed by an integral finger of the shell. The IC card has the cut-out area at a corner of an insertion end of the card aligned with the stop finger when the card is properly inserted into the connector.

Other objects, features and advantages of the invention will be apparent from the following detailed description taken in connection with the accompanying drawings.

BRIEF DESCRIPTION OF THE DRAWINGS

The features of this invention which are believed to be novel are set forth with particularity in the appended claims. The invention, together with its objects and the advantages thereof, may be best understood by reference to the following description taken in conjunction with the accompanying drawings, in which like reference numerals identify like elements in the FIGS. and in which:

DETAILED DESCRIPTION OF THE PREFERRED EMBODIMENTS

Referring to the drawings in greater detail, and first to FIGS. 1–5, the invention is embodied in an IC card connector, generally designated 10, which includes a dielectric housing, generally designated 12, which may be molded of plastic material or the like. The top and sides of the housing are substantially covered by a metal shell, generally designated 14, which may be stamped and formed of sheet metal material.

Dielectric housing 12 of connector 10 is generally U-shaped to define a body 16 and opposite longitudinal legs 18 and 20 between which an IC card 22 may be inserted in the direction of arrow "A" (FIG. 1) from the front of the connector. Body 16 of housing 12 mounts a plurality of terminals 24. Each terminal includes a contact portion 24a for engaging a contact or terminal on IC card 22 and a tail portion 24b for connection, as by soldering, to appropriate circuit traces on a printed circuit board (not shown) to which connector 10 is mounted Tail portions 24b are located at the rear of the connector and are generally flush with the bottom of housing 12.

Metal shell 14 of connector 10 includes a generally U-shaped top plate formed by a major plate portion 26 and a pair of leg portions 28 and 30. Major plate portion 26 of the shell covers the top of body 16 of the housing, and leg portions 28 and 30 of the shell cover substantial portions of legs 18 and 20, respectively, of the housing.

Leg portion 28 of the shell is bent to form a side wall 32 (FIGS. 3 and 4) which substantially covers the side of leg 18 of the housing. Leg portion 30 of the shell is bent to form a side wall 34 (FIGS. 2 and 3) which substantially covers the side of leg 20 of the housing. Legs 18 and 20 of tie housing have latching projections 36 (FIGS. 2 and 4) which snap into latch openings 38 in the side walls of the shell to hold the shell onto the housing.

Figure 1:
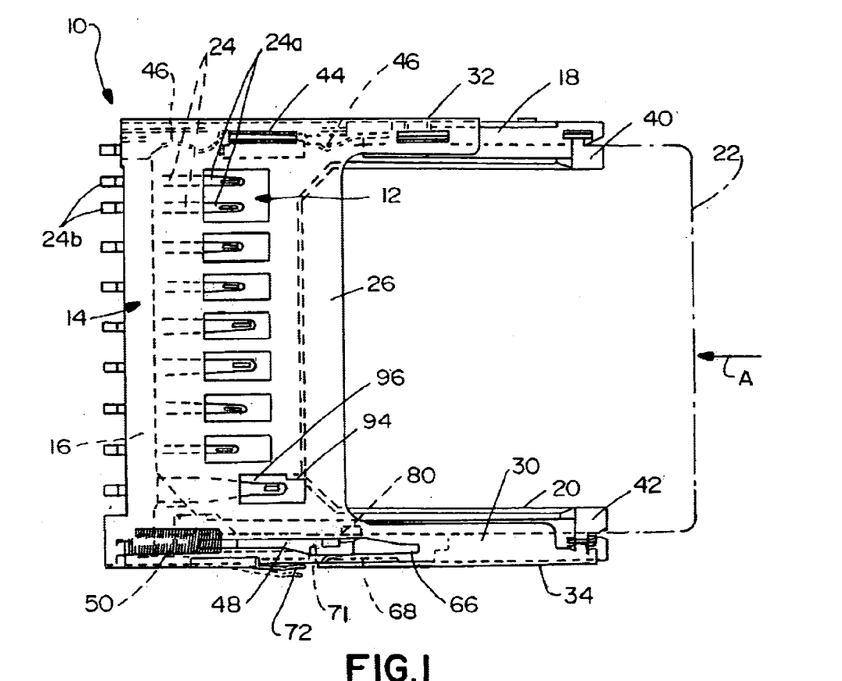
FIG. 1 is a top plan view of an IC card connector embodying the concepts of the invention.
Figure 2:
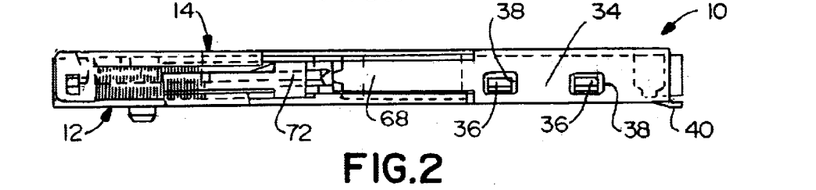
FIG. 2 is a side elevational view of the connector, looking at the right-hand side of the connector as viewed in FIG. 1.
Figure 3:
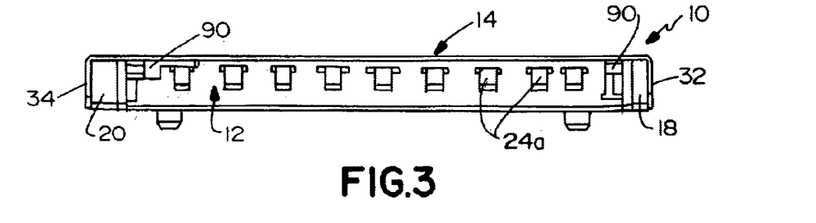
FIG. 3 is a front elevational view of the connector.
Figure 4:
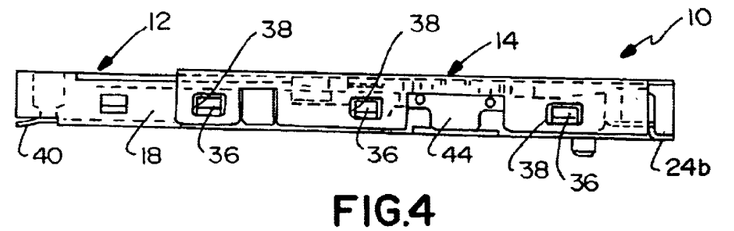
FIG. 4 is a side elevational view of the connector, looking at the left-hand side of the connector as viewed in FIG. 1.
Figure 5:
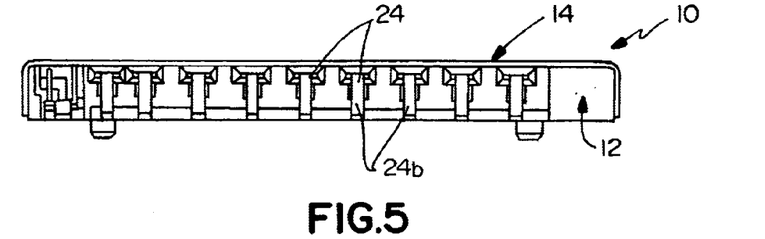
FIG. 5 is a rear elevational view of the connector.
Figure 6:
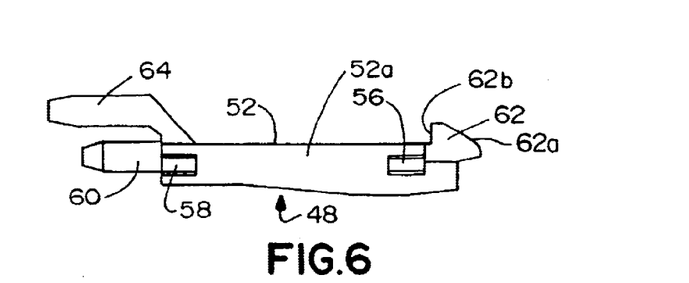
FIG. 6 is a top plan view of the slider of the connector.

As best seen in FIGS. 1 and 4, a metal boardlock 40 is mounted on leg 18 of housing 12 for connection, as by soldering, to a mounting pad on the printed circuit board. As best seen in FIG. 1, another boardlock 42 is formed integrally with leg portion 30 of metal shell 14 for connection, as by soldering, to a mounting pad on the printed circuit board. Boardlock 42 actually may be soldered to a ground circuit on the printed circuit board to ground the metal shell to the board.

Referring specifically to FIG. 1, a fixed switch 44 is mounted on body 16 of housing 12, and a pair of movable switch arms 46 also are mounted on the housing. The switch and switch arms are connected to appropriate circuits on the printed circuit board and form a detector switch mechanism engageable by a side edge of the IC card to move switch arms 46 away from fixed switch 44 sequentially to detect the position of the card.

Generally, a card ejector mechanism is mounted on the side of body 16 of housing 12 opposite detector switches 44 and 46. Specifically, the card ejector mechanism includes a slider 48 which is biased opposite the insertion direction "A" (FIG. 1) of the IC card, by a coil spring 50 sandwiched between the slider and the housing.

FIGS. 6–10 show slider 48 in greater detail. The slider is a one-piece structure which may be molded of plastic material, or the like. The slider has an elongated body 52 having a top side 52a and a bottom side 52b. A cam slot 54 is formed in an outer side of the slider. A pair of projections 56 project upwardly and downwardly from the slider at the front of body 52, and a pair of projections 58 project upwardly and downwardly from the top and bottom of the body at the rear end thereof. A round cylindrical boss 60 projects from the rear of the body and about which coil spring 50 is fitted. A lock member 62 projects inwardly from the front end of the slider and includes a forward chamfered surface 62a and a rear locking surface 62b. Finally, a card detent 64 projects rearwardly of the slider offset from spring-fitting boss 60. When and IC card is inserted into the connector, one corner of the card abuts detent 64 and pushes slider 48 in the insertion direction against biasing spring 50.

Figure 11:
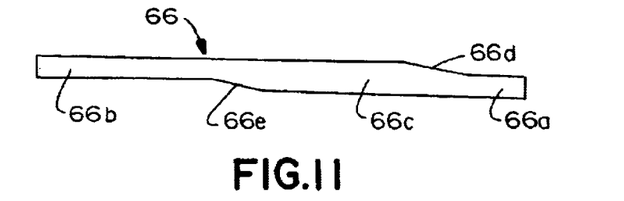
FIG. 11 is a schematic, enlarged illustration of the guide slot in the shell of the connector.

Projections 56 and 58 of slider 48 ride loosely in guide slots 66 which are best seen in FIGS. 1 and 11. There are upper and lower guide slots, one of which is shown clearly in the shell in FIG. 1, and the other of which is formed in a bottom plate 70 (FIGS. 16, 18 and 20) of housing 12. In essence, the slider rides in the guide slots on the outside of leg 20 of the housing between the metal shell and the bottom plate of the housing.

Referring specifically to FIG. 11, each guide slot 66 includes front and rear sections 66a and 66b, respectively, which are generally of the same width but offset laterally of each other. An intermediate slot section 66c is disposed between the front and rear slot sections and is joined thereto by angled or oblique front and rear transition sections 66d and 66e, respectively. The intermediate slot section is wider than the front and rear slot sections. When slider 48 moves back and forth corresponding to the insertion and withdrawal of the IC card, upper and is lower projections 56 near the front of the slider move back and forth in front slot section 66a and intermediate slot section 66c of guide slots 66. Correspondingly, upper and lower projections 58 at the rear of slider 48 move back and forth between rear slot sections 66b and intermediate slot sections 66c of guide slots 66. Therefore, when the slider moves back and forth in the guide slots, the slider swings in a plane included in the drawings of FIGS. 1 and 11. Swinging movement of slider 48 also is effected by a push spring 68 (FIGS. 1 and 2) which is stamped out of side wall 34 of the metal shell. The push spring abuts against the front end of slider 48.

Figure 7:
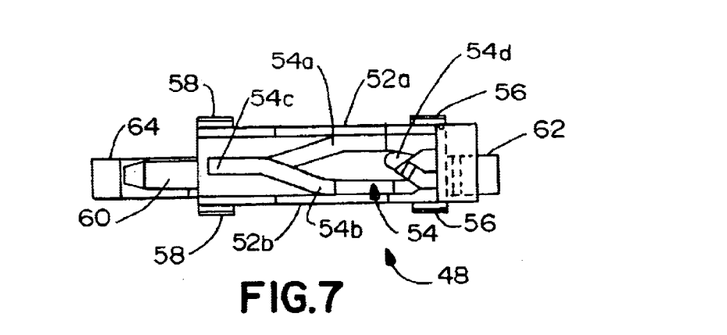
FIG. 7 is an elevational view of the slider as looking along line 7—7 of FIG. 6.
Figure 8:
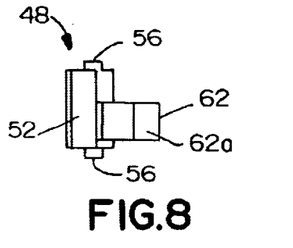
FIG. 8 is an end elevational view of the slider taken along line 8—8 of FIG. 6.
Figure 9:
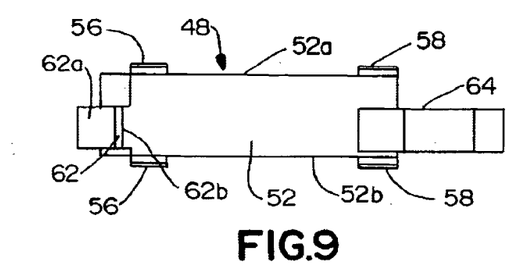
FIG. 9 is a side elevational view of the slider taken along line 9—9 of FIG. 6.
Figure 10:
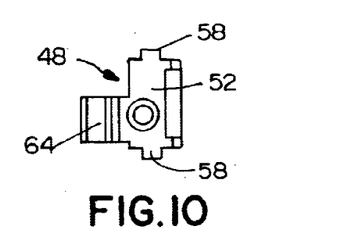
FIG. 10 is an end elevational view as looking at the left-hand side of FIG. 6.

Referring specifically to FIG. 7, the card ejector mechanism of connector 10 is of the known push/push type including cam slot 54. A round pin 71 (FIG. 1) is generally U-shaped to define opposite pin ends. One pin end is disposed in cam slot 54 and the other pin end is rotatably attached to body 16 of housing 12, thereby permitting the pin to follow cam slot 54. A push spring 72 is stamped out of side wall 34 of the metal shell to confront pin 71 and constantly bias the pin into cam slot 54. The cam slot, itself (FIG. 7), is of the known "heart-shaped" type and includes a first cam groove 54a defining movement of the slider inwardly from a preload position to a latched position. A second cam groove 54b defining movement of the slider back from its latched position to the preload position. In the preload position, pin 71 is located at an initial point 54c of the cam slot. In the latched position, pin 71 is located in a recess 54d of the cam slot. Various stepped surfaces along the first and second cam grooves prevent the pin from moving backward from this defined path of movement. At all times, coil spring 50 biases the slider in the forward direction and holds pin 71 in recess 54d in the latched position of the slider and the IC card. A second "push" of the mechanism causes the pin to move out of recess 54d and into the return cam groove 54b.

Figure 12:
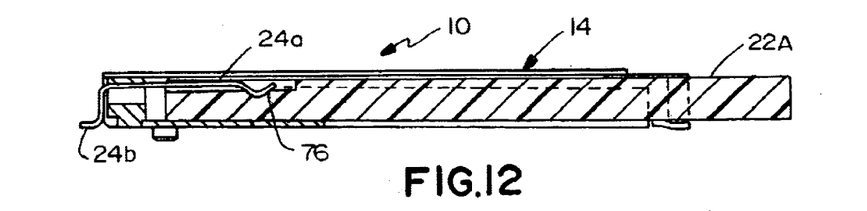
FIG. 12 is a front-to-rear section through the connector.
Figure 13:
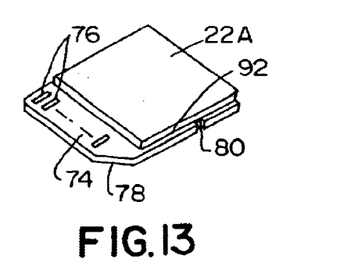
FIG. 13 is a perspective view of one type of IC card for use with the connector.

FIG. 12 shows card connector 10 receiving an IC card 22A of a first type which is shown in FIG. 13. This first type of card has a forward portion 74 which is thinner than the remaining part of the card. An array of contacts 76 is disposed on the thin forward portion 74 of the card. One forward corner 78 of the card is cut-out or chamfered as seen in FIG. 13. The card also has a lock portion in the form of a locking recess 80 in the same side or edge thereof as chamfered corner 78. When card 22A is inserted into connector 10, contacts 76 on the card engage contact portions 24a of terminals 24 of the connector. When it is desired to eject the card from the connector, the card is pushed a short distance in the insertion direction to cause pin 71 (FIG. 1) to move out of recessed area 54a (FIG. 7) of cam slot 54, and coil spring 50 returns the slider and card automatically back to its preload position.

As stated above, the first type of IC card 22A has locking recess 80 (FIG. 13) at one side thereof. This locking recess receives lock member 62 (FIG. 6) of slider 48. Lock member 62 is positioned relative to card detent 64 at the rear of the slide so that the lock member will enter locking recess 80 when chamfered corner 78 of the card abuts against card detent 64 of the slider.

Figure 14:
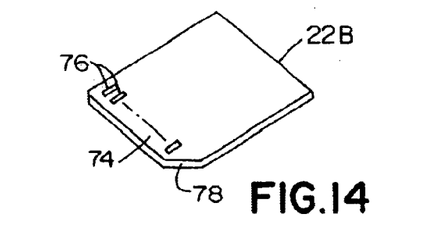
FIG. 14 is a perspective view of a second type of IC card for use with the connector.

FIG. 14 shows an IC card 22B of a second type which again includes contacts 76 at front end 74, along with chamfered corner 78. Connector 10 is designed to accommodate both of the different types of IC cards 22A and 22B because of the manner of operation of slider 48, as described below.

Figures 15, 16, 17:
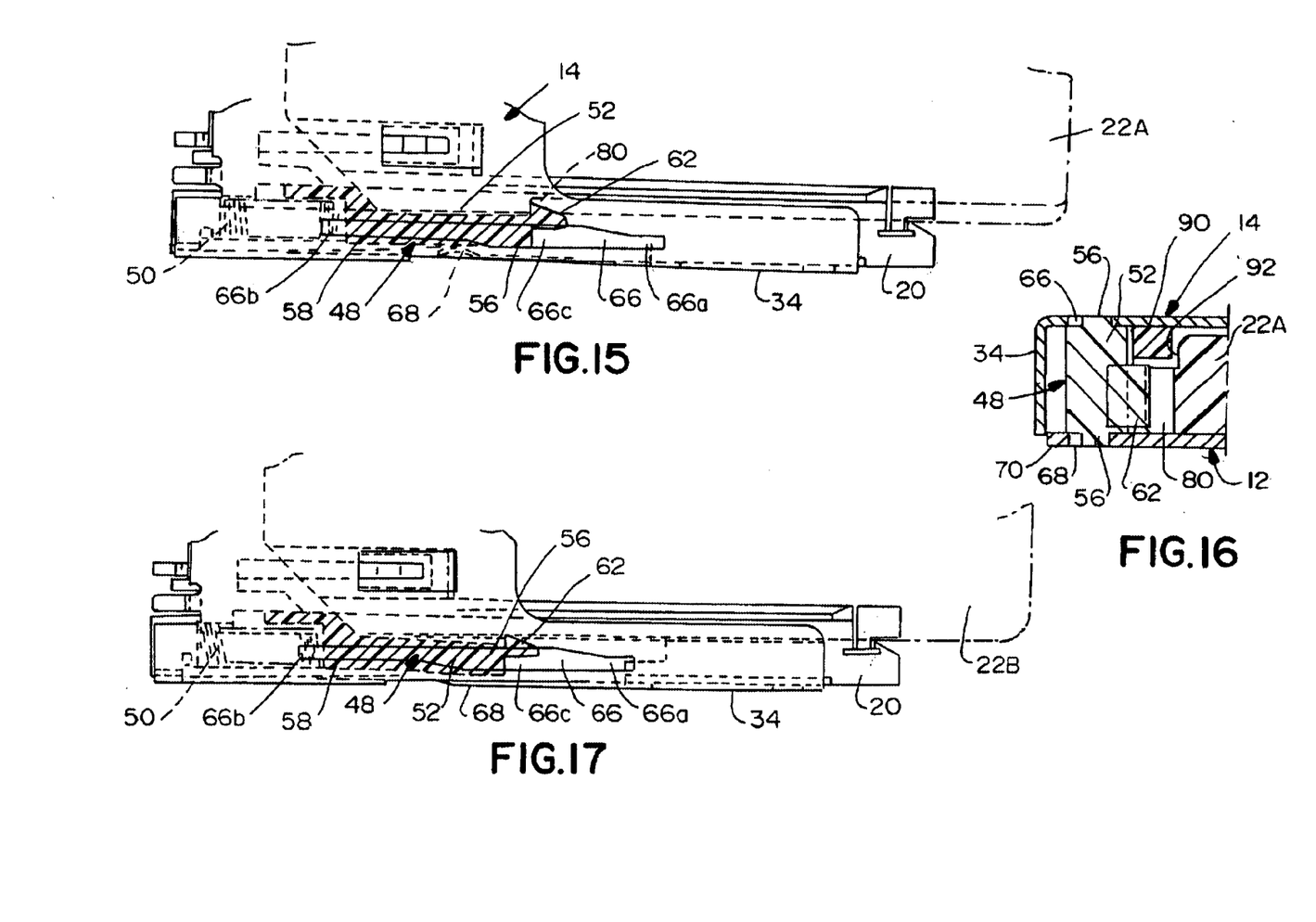
FIG. 15 is an enlarged, fragmented plan view of the slider area of the connector, with the slider engaged with a card of the first type.
FIG. 16 is a fragmented section through the pivotal mounting area at the engagement area of the slider in conjunction with a card of the first type.
FIG. 17 is a view similar to that of FIG. 15, showing an IC card of the second type inserted into the connector.

Specifically, FIGS. 15 and 16 show connector 10 receiving IC card 22A of the first type (FIG. 13). As card 22A is inserted into the connector, slider 48 is yieldably pushed against coil spring 50. Projections 58 at the rear of the slider move into rear slot sections 66b of guide slots 66, whereas projections 56 at the front of Oe slider move into intermediate slot sections 66 of the guide slots. The front end of the slider is biased toward IC card 22A by push spring 68 and, therefore, projections 56 are pushed against the inner longitudinal edge of the intermediate slot sections. This causes body 52 (FIG. 6) of the slider to become aligned generally parallel with longitudinal leg 20 of the housing. Lock member 62 of the slider enters locking recess 80 of the card whereby locking surface 62b (FIG. 6) lockingly engages within the locking recess. Thus, IC card 22A is locked to the slider and prevented from being pulled out of the connector by hand. FIG. 16 shows how lock member 62 is disposed within recess 80. Push spring 68 is transmitted to card 22A through the slider so that the card is biased against leg 18 of the housing to ensure proper engagement with movable detect switches 46.

Figures 18, 19, 20, 21:
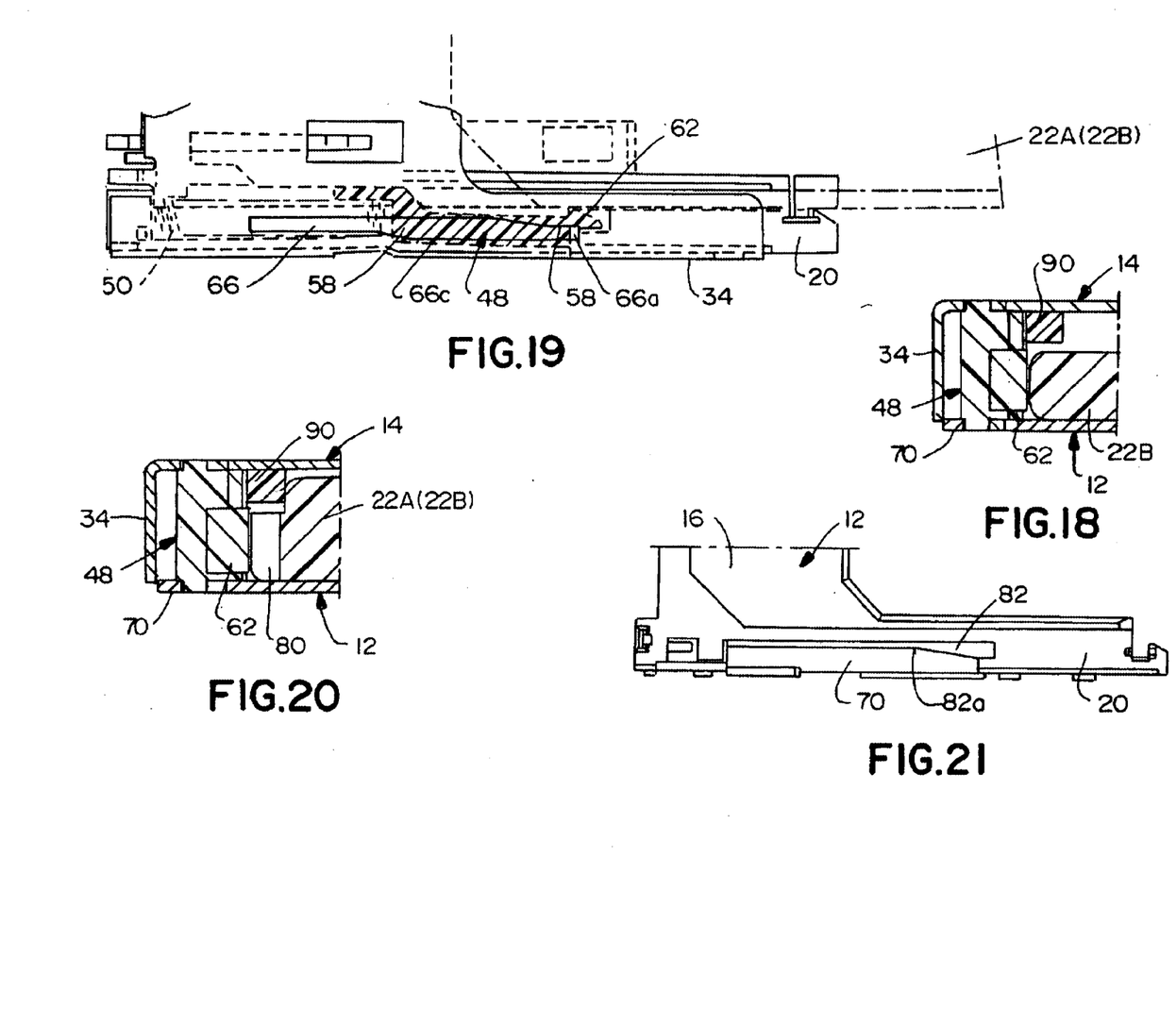
FIG. 18 is a view similar to that of FIG. 16, in conjunction with the card of the second type.
FIG. 19 is a view similar to that of FIGS. 15 and 17, illustrating how the slider operates in ejecting either type of IC card.
FIG. 20 is a view similar to that of FIG. 16.
FIG. 21 is a fragmented plan view of a connector according to another embodiment in which the housing has a guide rail formed thereon.

FIGS. 17 and 18 show connector 10 receiving the second type of IC card 22B. As stated above in regard to FIG. 14, card 22B of the second type has no locking recess 80. As described heretofore, projections 58 at the rear of slider move into rear slot section 66b of guide slot 66 as front projections 66a move into intermediate slot sections 66c of the guide slots. Since IC card 22B of the second type has no locking recess, lock member 62 (FIG. 6) is pushed outwardly, thus allowing front projections 56 to move outwardly of the enlarged slot sections 66c. Body 52 of the slider is pivoted outward at its front end. This allows the card which has no locking recess to move past lock member 62 of the slider since the front end of the slider can pivot outwardly. Again, push spring 68 is effective to bias the IC card for engagement with movable detect switches 46.

FIGS. 19 and 20 show the manner in which the push/push type of card ejector mechanism can eject either the first or second types of IC cards 22A or 22B, respectively. Specifically, slider 48 is driven forwardly by coil spring 50 to eject the card from the connector. Projections 58 at the rear of the slider are located in intermediate slot sections 66c of guide slots 66 whereas projections 56 at the front of the slider are located in front slot sections 66a of the guide slots. Therefore, the front end of the slider is pivoted outwardly and lock member 62 moves outwardly therewith so that lock member 62 moves out of locking recess 80 to unlock the card, and the card and slider can be moved automatically back to their preload position.

Figure 22:
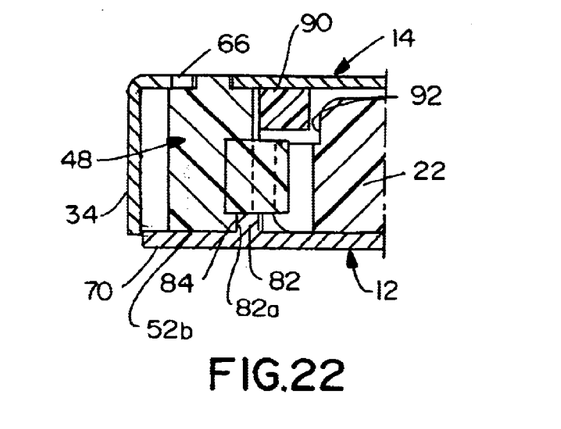
FIG. 22 is a view similar to that of FIG. 16, but with the housing having the guide rail of FIG. 21.

FIGS. 21 and 22 show how projections 56 and 58 on slider 48 can be modified. Specifically, a guide rail 82 is formed on bottom plate 70 of the dielectric housing, and an engagement shoulder 84 is formed on the bottom of slider 48. An elongated side wall 82a of guide rail 82 is formed to be the same shape as front slot section 66a (FIG. 11) oblique edge 66d, the inner edge of intermediate slot section 66c and rear slot section 66b of guide slots 66. Guide rail 82 is effective to reinforce the bottom plate 70 of the housing.

Figures 23, 24:
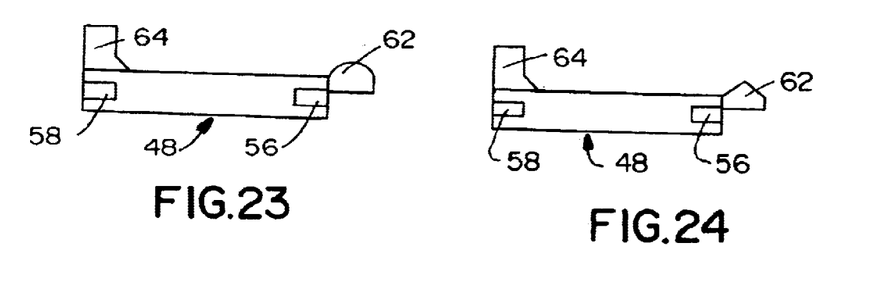
FIGS. 23–25 are top plan views of different embodiments of the slider.
Figure 25:
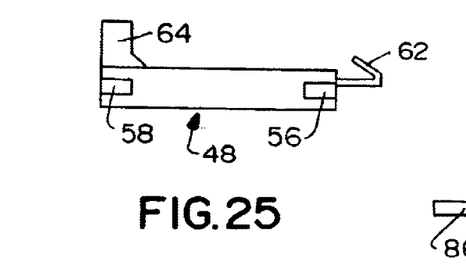

FIGS. 23–25 different modifications of slider 48 are shown in which the lock member is other than heart-shaped. In each embodiment, front and rear projections 56 and 58, respectively, again are provided. In addition, some type of cam detent 64 is provided. In the embodiment of FIG. 23, the lock member 62 is rounded or dome-shaped. In the embodiment of FIG. 24, the lock member is triangularly shaped. In the embodiment of FIG. 25, the lock member is hook-shaped.

Figure 26:
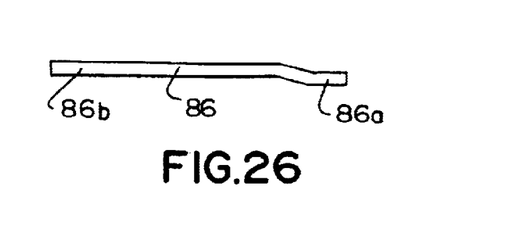
FIG. 26 is a somewhat schematic illustration of a different embodiment of the guide slot similar to that of FIG. 11.

In the event that an IC card 22B (FIG. 14) of the second type is provided with a locking recess 80, guide slot 66 may be modified as shown in FIG. 26. The modified guide slot 86 has a width equal to the width of projections 56 or 58 of slider 48. When the slider is moved inwardly, projections 56 at the front end of the slider move into rear slot sections 86b, moving the lock member inwardly. When the slider is moved forwardly, projections 56 move forwardly into slot sections 86a to move the lock member outwardly.

Finally, connector 10 is provided with a feature which prevents either IC card 22A or 22B of the first or second type, respectively, from being inserted into the connector in wrong orientations. In other words, the cards cannot be inserted upsidedown or rear side forward. Specifically, in the case of IC card 22A of the first type, a stopper projection 90 (FIGS. 16 and 18) is provided on housing 12. As seen in FIG. 13, card 22A has a longitudinal groove 92 which clears stopper projection 50 as seen in FIG. 16 when the card is properly oriented. However, if card 22A is turned upside-down or inverted front-to-rear, the card will abut stopper projection 50 whereby the card cannot be inserted completely into the connector, such wrong insertion possibly causing deformation of contact portions 24a of terminals 24 of the connector.

In addition, a stopper tab 94 (FIG. 1) is stamped and formed out of a window 96 in major plate portion 26 of the metal shell. This stopper tab is located to be in the area of chamfered corner 78 of either IC card If the cards are inverted or turned upside-down, the full corners of the cards will abut stopper tab 51 and prevent the card(s) from being fully inserted into the connector.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

What is claimed is:

1. A card connector (10) for connecting different types of IC cards (22A, 22B), comprising:

a housing (12) for receiving an IC card for movement between a preload position and a latched position;

a slider (48) movably mounted on the housing and engageable with the IC card for movement therewith between said preload and latched positions;

latch means (54, 71) operatively associated between the slider (48) and the housing (12) for latching the slider in said latched position and including a cam mechanism (54) defining the movement of the slider (48) on the housing, wherein the cam mechanism includes a first cam groove (54a) on the slider (48) defining movement of the slider to said latched position, a second cam groove (54b) on the slider defining movement of the slider back to said preload position, and a cam follower pin (71) on the housing for riding in the cam grooves; and a lock member (62 on the slider engageable in a locking position with a lock portion (80) of one type of IC card (22A) for locking the IC card to the slider (48), the lock member being movable to an inoperative position to allow an IC card of a second type (22B) which does not have a lock portion (80) to be inserted into and retained within the connector (10).

2. The card connector of claim 1, including biasing means (68) for biasing the lock member (62) toward its locking position.

3. The card connector of claim 1 wherein said lock member (62) is integral with the slider (48), and the entire slider is movable on the housing (12) to move the lock member to its inoperative position.

4. The card connector of claim 3 wherein said slider (48) is pivotally mounted on the housing (12) to pivotally move the lock member (62) to its locking position.

5. The card connector of claim 4, including biasing means (68) for biasing the slider (48) toward the operative position of the lock member (62).

6. The card connector of claim 5, including a metal shell (14) about at least a portion of the housing, said biasing means comprising a flexible wall portion (68) of the shell.

* * * * *